July 14, 1970

T. ADAMS 3,520,194

CALIBRATION METHOD AND APPARATUS FOR A PHYSIOLOGIC
EVAPORATIVE WATER LOSS MEASUREMENT SYSTEM

Original Filed Oct. 22, 1964

INVENTOR.
THOMAS ADAMS
BY
*Harvey L. Boyd*
ATTORNEY

United States Patent Office 3,520,194
Patented July 14, 1970

3,520,194
CALIBRATION METHOD AND APPARATUS FOR A PHYSIOLOGIC EVAPORATIVE WATER LOSS MEASUREMENT SYSTEM
Thomas Adams, East Lansing, Mich., assignor to the United States of America as represented by the Secretary of the Army and/or the Administrator of the Federal Aviation Agency
Original application Oct. 22, 1964, Ser. No. 405,879. Divided and this application Mar. 14, 1967, Ser. No. 623,146
Int. Cl. G01d 18/00
U.S. Cl. 73—1            1 Claim

ABSTRACT OF THE DISCLOSURE

The disclosure describes a method of measuring physiologic evaporative water loss by measuring the change in thermal conductivity of a gas passed over a specific portion of the body surface. An apparatus used to measure the water loss is described together with a method of calibrating said apparatus wherein constant rates of evaporation at preselected temperatures are measured.

---

The invention described herein may be manufactured and used by or for the Government for governmental purposes without the payment to me of any royalty thereon.

CROSS-REFERENCES TO RELATED APPLICATIONS

This is a divisional application of my co-pending patent application, Ser. No. 405,879, filed Oct. 22, 1964, now Pat. No. 3,318,302.

BACKGROUND OF THE INVENTION

Field of the invention

This invention relates to the measurement of physiologic evaporative water loss and more particularly relates to a calibrating device used to provide a preselected series of constant rates of evaporative moisture in a controlled temperature environment for calibrating a cell used to measure the rate of said water loss.

Description of the prior art

The precise measurement of evaporative water loss is essential to an accurate evaluation of this avenue of heat loss in acute and chronic exposure to heat. Also, in psychological studies, the quantitative measurement of sweaty, particularly palmar sweating plays an equally important role in establishing an index of emotional stress and anxiety.

A number of techniques have been used in the past to measure sweat gland activity in thermoregulatory and exercise physiology, and in experimental psychology. The most direct method, measurements of body weight changes in time, lacks the precision demanded in most studies, and is applicable only under conditions of sizable sweat production. Infrared analyzers, resistance hygrometric elements and "coulometric cells" supply the desired sensitivity, but are too expensive or cumbersome for most applications. Experiments by the inventor have indicated that resistance hygrometric systems are adequately sensitive in response to small changes in water vapor, but are too difficult to calibrate due to a large time constant associated with the desorbtion of water from the hygroscopic mass. The characteristics of the hysteresis loops occurring in the calibration curves depended on the calibration procedures.

This invention provides a sensitive, inexpensive system for the measurement of evaporative water loss. The technique is based upon the varying thermal conductivity due to density changes caused by fluctuations in the water vapor content of air flowing through a thermal conductivity cell.

SUMMARY OF THE INVENTION

This invention in particular provides a sensitive, inexpensive system for the calibration of a thermal conductivity cell whereby a known amount of evaporation is carried by a gas into the cell at a preselected temperature and at preselected rates for recording thermal conductivity thereof. Said recordings are then used to construct a calibration curve whereby the recorded output of the cell can be converted directly, through the use of said curve, to the rate of evaporation at a constant temperature and flow rate.

Accordingly, it is an object of this invention to provide a thermal regulated source of a plurality of constant evaporative rates.

It is a further object to provide a calibrating device that may be substituted directly into a physiologic evaporative water loss measurement system in place of the source to be measured.

It is another object to provide a simple, accurate calibrating device for use with a thermal conductive cell to measure the output of said cell proportional to a known evaporative input.

These and other objects will become apparent with reference to the following drawings and description.

DESCRIPTION OF THE PREFERRED EMBODIMENT

Figure 1:
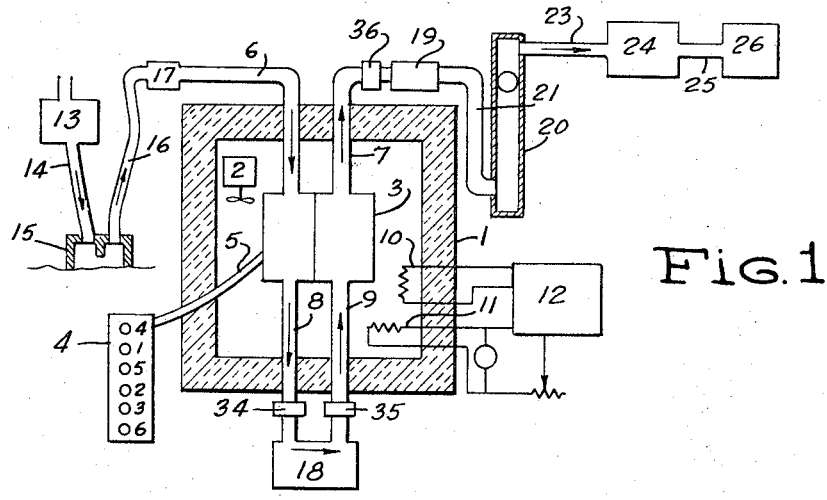
FIG. 1 is a schematic of a physiologic evaporative water loss measurement system.
Figure 2:
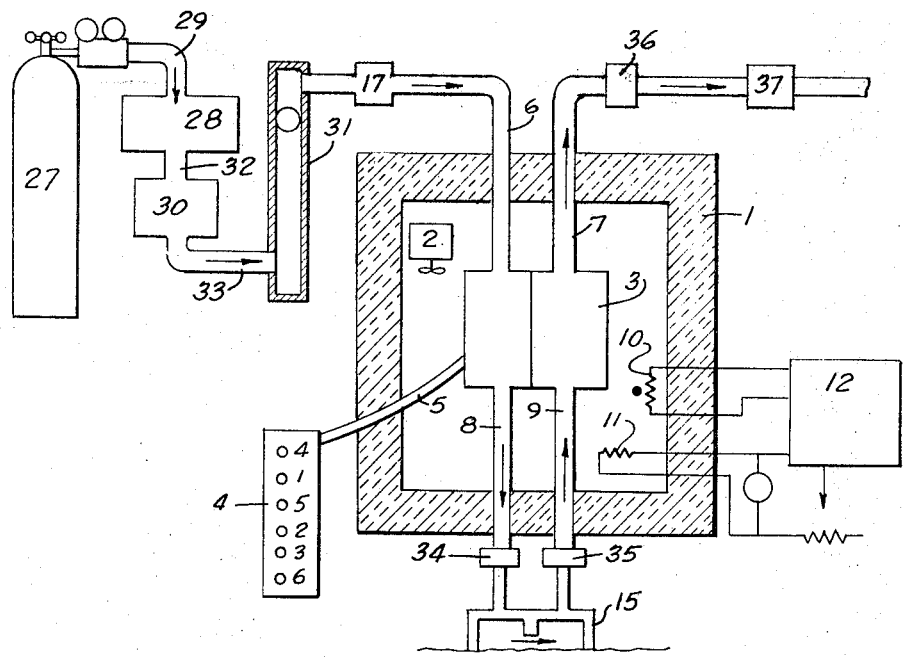
FIG. 2 is a schematic representation of another embodiment of the apparatus of FIG. 1.

With reference to FIGS. 1 and 2 the apparatus consists of an insulated housing 1 containing a fan 2 and a thermal conductivity cell 3. The specific cell used was a model 9677 thermal conductivity cell manufactured by the GOW–MAC Instrument Co., which cell is supplied with terminal block 4, numbered as shown for connection to a bridge measuring circuit. Other cells, can of course be used. The specific cell used is sold as a unit comprising the cell 3, connecting cable 5 and terminal block 4. The internal structure of the thermal conductivity cell is not shown since such cells are known to the art and the structure of the cell forms no part of the instant invention. Four conduits 6, 7, 8, and 9 extend through the insulation and are connected to the thermal conductivity cell to provide a flow of gas through both sides of the cell. Since it is essential that a constant temperature be maintained within the insulated housing, a temperature sensing element 10 and a heater element 11 are mounted within insulated housing 1 and are connected to a suitable temperature controller shown schematically at 12. The specific control means used was a thermoregulator with a set point at 50° C., Cat. No. 55260 manufactured by the Chicago Apparatus Co., 1827 McGee St., Kansas City, Mo. 64108.

The terminal block 4 is connected to a suitable bridge measuring circuit and imbalance as measured on a suitable recorder connected to the bridge circuit. The recorder used herein was a Varian Graphic Model G–14.

The process can be carried out using either room air as in FIG. 1 or compressed gas as in FIG. 2 but in both cases the basic cell assembly, housing and circuitry are the same. The type of gas source used controls the arrangement of the ancillary equipment.

Referring now to FIG. 1, the structure used when room air is the source as shown. Room air enters a drying unit 13 filled with Drierite or other suitable dehydrating agent. The drying unit 13 is connected through tubing 14 to the skin capsule 15 which will be described in detail below. Tubing 16 connects capsule 15 to conduit 6 by means of a releasable tubing connector 17. Conduit 8 is connected by tubing connector 34 to drying unit 18, which is also filled with material similar to that in drying unit 13. Conduit 9 is connected to drying unit 18 by connector 35. Conduit 7 is connected by tubing connector 36 to an adjustable needle valve 19 which is in communication with a flow meter 20 through tubing 21. Flow meter 20 is connected to tubing 23 which leads into a chamber 24 connected to pump 26 by tubing 25. The function of chamber 24 is to provide a large air capacitance in series with the pump to clamp any minor flow or pressure fluctuation. The direction of flow through the apparatus is shown by the arrows.

With reference now to FIG. 2 a source of compressed air 27 is connected to a flow regulator 28 by tubing 29. A drying unit 30 is connected between flow regulator 28 and flow meter 31 by tubing 32 and 33. Flow meter 31 is connected to conduit 6 by tubing connector 17. Conduits 8 and 9 are connected to skin capsule 15 by connectors 34 and 35. For calibration purposes tubing connector 36 connects conduit 7 to calibration units 37, containing a weighed amount of dehydrating agent. In use in a test connector 36 is vented to the atmosphere.

To initially calibrate the cell, as will be explained more fully below, it is necessary to obtain several different, constant rates of water evaporation. A calibrating unit for obtaining such rates is shown generally in FIG. 3 as 50. The unit 50 consists of a brass block 38 having a stepped cavity 39 extending inwardly from the surface thereof. The number of steps should be approximately 4 or 5 to provide for adequate calibration. The hole may be made by boring the smallest diameter hole to the desired depth and then overboring with successively larger drills to produce the configuration shown in FIG. 3. Although brass was the material used it is not critical and any thermal conductor such as copper or aluminum or even iron, for example, could be used.

A heater element 40 surrounds the block and is connected to suitable control means shown schematically at 41 for maintaining constant controllable temperatures within the block 38. The whole assembly is enclosed by insulation 42 having an opening aligned with the cavity 39. A two holed stopper 43 containing tubes 44 and 45 seals the whole assembly.

Figure 3:
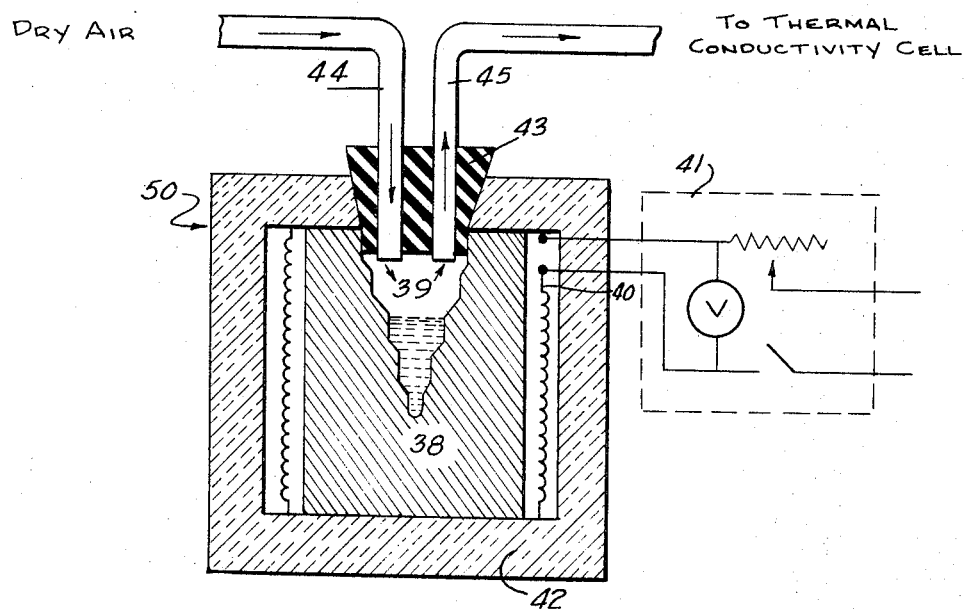
FIG. 3 is a sectional view of the controllable source of water vapor for calibration of the thermal conductivity cell.

*Calibration procedure.*—In order to translate the readings of cell imbalance obtained from the recorder into experimentally meaningful results in terms of mgm of water/min. it is necessary to first calibrate the thermal conductivity cell. To do this three requirements must be met. A source of dry air is required, a controllable source of evaporating water is necessary and means are required to determine the amount of water evaporated during a given time. To acomplish this the device shown in FIG. 3 is inserted in the gas circuits of FIGS. 1 and 2 in place of capsule 15. Carefully weighed containers of a dehydrating agent such as Drierite are placed in the circuit as shown in FIG. 2 or in place of drying unit 18 of FIG. 1. Before the calibration is to be made the needle valve 19 of FIG. 1 or the flow regulator 28 of FIG. 2 are adjusted to maintain a constant air flow of approximately 200 cc./min. The cavity 39 in calibration unit 50 is filled with water to the top of one of the vertical portions of the stepped cavity 39 and the unit is brought to a predetermined temperature and inserted in the circuit. Carefully weighed samples of Drierite of approximately 50 gms. are inserted in the circuits at 18 and 37 and the apparatus is permitted to run for a prescribed time interval of for example, 5 minutes.

The constant reading of the recorder is noted and the samples are weighed to determine the amount of water absorbed during the time interval. This procedure is repeated at different temperatures of unit 50 and with the water at the various levels within the stepped cavity 39.

Figure 5:
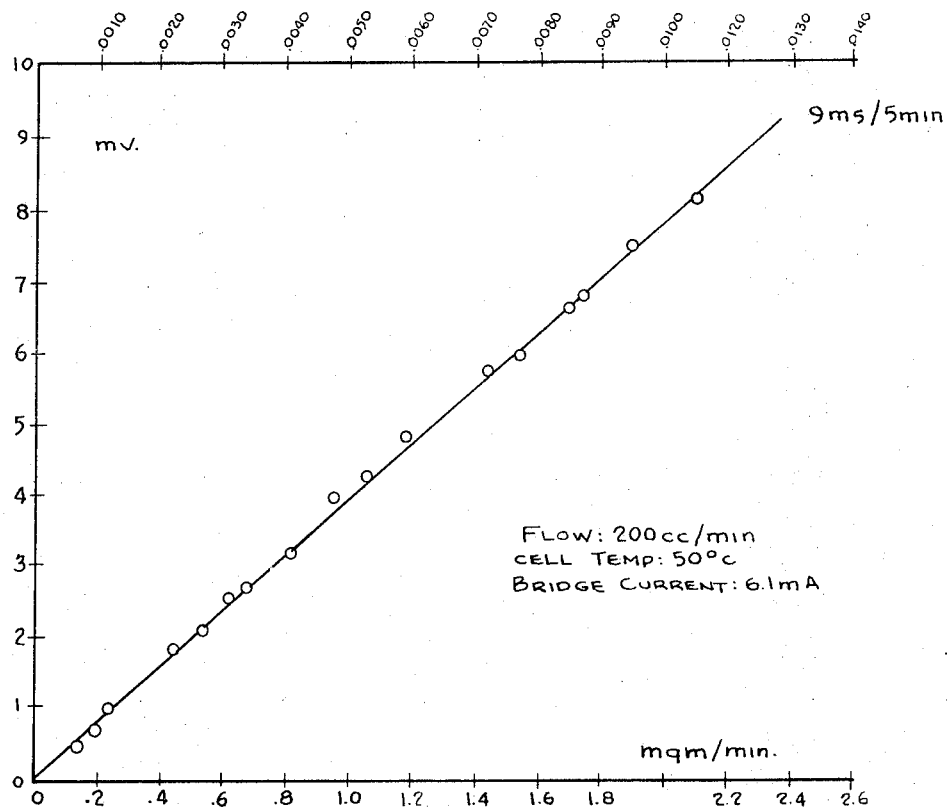
FIG. 5 is a tracing of psychogenic sweating obtained by the invention.

FIG. 5 represents a calibration curve obtained by plotting the multivolt readings of bridge imbalance obtained from the recorder against the rate of water evaporation determined by weighing of the samples. Bridge imbalance is shown as a function of the rate of water vapor production at a bridge sensitivity setting of 4500 ohms. Increased or decreased cell sensitivity would allow for measurements of other ranges of rates of water vapor production, with the upper limit being defined by the saturation of air at the ambient temperature in which the unit is operated. The calibration points for this curve were obtained on different days, reproducing operating values of the system at each different test.

The plot is a straight line making the conversion from millivolts to mgm. water/min. quite simple and the recorder paper may be directly labled in terms of mgm./min. Since the system is shown to respond to very small rates of water vapor production, it is of course, important that fresh Drierite be used in each drying cylinder. Calibration bottles were weighed to the nearest 0.1 mgm. No changes in the calibration curve were noted on successive days of measurement, a characteristic not shared by an infrared analyzer technique.

To facilitate the calibration of the device it has been found helpful to have the calibration bottles containing Drierite connected in parallel around drying unit 18 of FIG. 1 with suitable valve provided so that the air flow can be rapidly switched from drying unit 18 to the calibration bottles.

Likewise a two way valve with a vent line can be inserted in FIG. 2 between connector 36 and calibration bottle 37 to switch flow of gas from atmospheric vent to the calibration bottle 37.

Latency and time constant of response of the unit depends on the size of the sampling capsule, the length and diameter of the tubing connecting to the cell, and the air flow rate through the system.

Two examples of the physiologic applications of the technique will now be given.

EXAMPLE I

Figure 6:
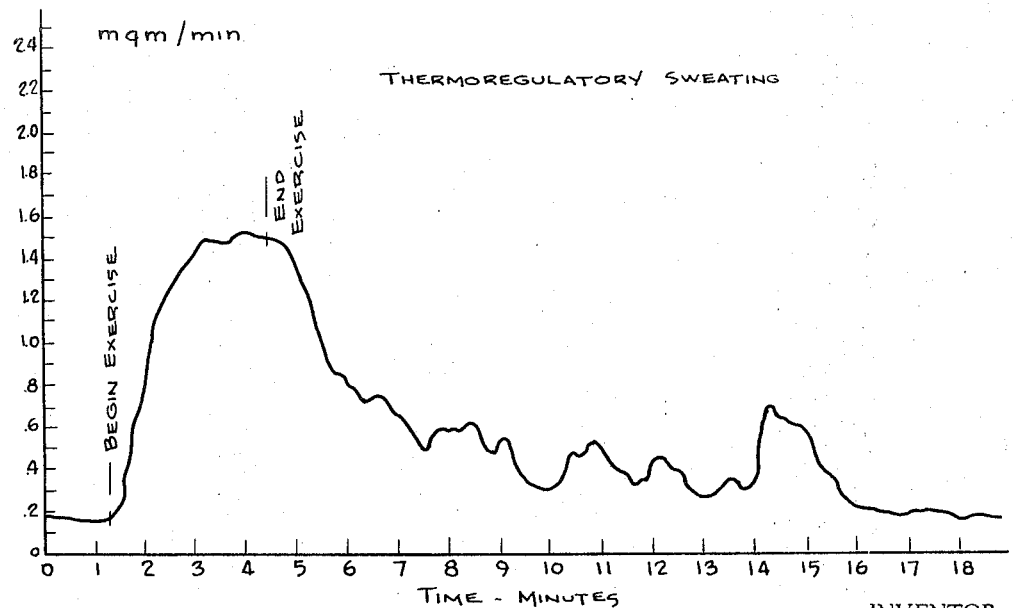
FIG. 6 is a tracing of thermoregulatory sweating obtained by the invention.

The cell was calibrated as set forth above. The capsule was connected to the fluid circuit as described and taped to the lateral surface of a subject's forearm. A constant gas flow of 200 cc./min. was obtained and the recorder was actuated. The subject ran in place for approximately 3½ minutes and tracings from the recorder indicated the change in thermoregulatory sweating throughout the test period from rest through exercise and back to rest. The tracing obtained is shown in FIG. 6.

EXAMPLE II

Figure 4:
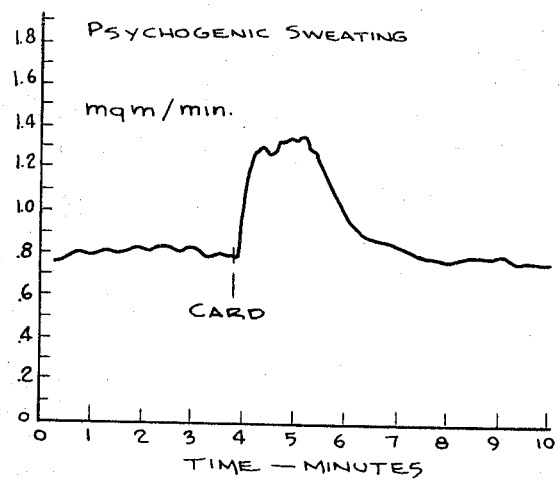
FIG. 4 is a calibration curve for the thermal conductivity cell.

The cell was calibrated as in Example I. The test capsule was inserted in the fluid circuit and taped to the palm of the subject's hand. A constant gas flow of 200 cc./min. was obtained and the recorder actuated. After a period of time the subject was shown a card carrying a profane word. The tracing of psychogenic sweating obtained is shown in FIG. 4.

Three types of information are obtainable from these records: (1) instantaneous rate (ordinate), (2) acceleration (slope of tracing at any part of the curve), of water vapor production, and (3) total amount of water produced (area under curve for any time interval).

The rate of flow of air at 200 cc./min. is in itself not critical. However, it is essential that the air flow rate be high enough to insure complete evaporation of sweat from the area being tested. This rate combined with the step of drying room air (or air from the compressed air tank) before it is presented to the skin provides a reproducible sample for the reference side of the cell and further insures complete evaporation of sweat by providing a steep vapor pressure gradient.

This invention has been described with respect to a specific embodiment thereof. Many minor modifications within the scope and spirit of the invention will readily occur to those skilled in the art. The scope of the invention therefore is not limited to the specific embodiment but is defined in the following claims.

I claim:
1. A device for facilitating the production of a plurality of constant rates of evaporation for calibrating an evaporative rate testing apparatus comprising:
  (a) a metallic block having a cavity extending inwardly from the upper surface thereof, said cavity having a plurality of stepped portions of successively smaller diameters corresponding to successively smaller cross-sectional surface areas of said cavity to measure the evaporative rate from said successively smaller surface areas, the largest diameter being at the surface and the smallest diameter being at the inner end of said cavity;
  (b) controllable heating means disposed between the sides of said block and said insulating means for maintaining a constant temperature within said cavity; and
  (c) insulating means enclosing said block and contacting the upper and lower surfaces of said block and spaced from the sides of said block, said insulating means being provided with an opening adjacent said cavity in said block in registry with the largest diameter portion of said cavity;
  (d) insulated inlet means disposed within said opening to direct the passage of air flow into direct contact with said cavity and outlet means disposed within said opening to direct the passage of said air flow out of said cavity, said insulated inlet and outlet means occupying said opening.

References Cited

UNITED STATES PATENTS

| 1,047,418 | 12/1912 | Kercher | 219—415 X |
| 1,188,734 | 6/1916 | Clement | 219—419 X |
| 2,111,056 | 3/1938 | Sickinger | 219—415 |

FOREIGN PATENTS

| 882,702 | 3/1943 | France. |

JOSEPH V. TRUHE, Primary Examiner

P. W. GOWDEY, Assistant Examiner

U.S. Cl. X.R.

219—271